US008966051B2

(12) United States Patent
Okamoto et al.

(10) Patent No.: US 8,966,051 B2
(45) Date of Patent: Feb. 24, 2015

(54) TECHNIQUE FOR MONITORING COMPONENT PROCESSING

(75) Inventors: Kohsuke Okamoto, Sagamihara (JP); Katsuyoshi Yamamoto, Machida (JP); Hiroyuki Ogura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 3618 days.

(21) Appl. No.: 10/768,905

(22) Filed: Jan. 30, 2004

(65) Prior Publication Data
US 2004/0220950 A1    Nov. 4, 2004

(51) Int. Cl.
*G06F 15/173*    (2006.01)
*G06F 11/34*    (2006.01)
*H04L 12/26*    (2006.01)

(52) U.S. Cl.
CPC .......... *G06F 11/3495* (2013.01); *G06F 11/348* (2013.01); *H04L 12/2602* (2013.01); *H04L 43/00* (2013.01)
USPC ............ 709/224; 709/203; 709/227; 709/228

(58) Field of Classification Search
USPC ........... 709/203, 223–224, 227–228; 707/100
See application file for complete search history.

(56) References Cited

U.S. PATENT DOCUMENTS

| 6,339,750 | B1 * | 1/2002 | Hoyer et al. | 702/182 |
| 6,711,137 | B1 * | 3/2004 | Klassen et al. | 370/252 |
| 6,885,641 | B1 * | 4/2005 | Chan et al. | 370/252 |
| 7,152,105 | B2 * | 12/2006 | McClure et al. | 709/224 |
| 7,409,453 | B2 * | 8/2008 | Chang et al. | 709/227 |
| 7,587,499 | B1 * | 9/2009 | Haghpassand | 709/229 |

FOREIGN PATENT DOCUMENTS

| JP | 60-087921 | 11/1986 | |
| JP | 05-073454 | 3/1993 | |
| JP | 05-276173 | 10/1993 | |
| JP | 11-088330 | 3/1999 | |
| JP | 2002-077070 | 3/2002 | ............ H04B 17/00 |

* cited by examiner

*Primary Examiner* — Mohammad A Siddiqi
(74) *Attorney, Agent, or Firm* — Steven M. Greenberg, Esq.; Crgo Law

(57) ABSTRACT

The present invention provides a technique for measuring the efficiency of components in a computer. An echo server is provided which comprises several units. A socket generation unit generates a receiving server socket on the basis of information on a correspondence between a plurality of components in a computer. And generates a client socket that is a dedicated socket inheriting information of the receiving server socket when data is transmitted. A stream acquisition unit acquires a transmission path for acquiring data transmitted and received between components. A thread generation unit generates a transmission path by coupling streams. A transfer execution unit transfers data acquired via a thread to an original destination component. Using these units, the technique monitors and running verifies behavior by observing data running on the network.

8 Claims, 15 Drawing Sheets

FIG. 8

|   | Reception address | Receiving port | Transfer destination address | Transfer destination port |
|---|---|---|---|---|
| 0 | www.external | 443 | realworker.internal | 443 |
| 1 | auth.internal | 443 | realworker.internal | 443 |
| 2 | directory.internal | 389 | realworker.internal | 389 |
| 3 | trans.internal | 8080 | realworker.internal | 8080 |
| ... | ... | ... | ... | ... |
| 1 | webapp.internal | 80 | realworker.internal | 80 |

TECHNIQUE FOR MONITORING COMPONENT PROCESSING

BACKGROUND OF THE INVENTION

1. Field of the Invention

The present invention relates to a method of monitoring component processing in a computer system, and more particularly to a method of monitoring exchange of data between the components within a computer.

2. Description of the Related Art

In a computer system, it is very important to acquire the system statistical information such as a CPU utilization factor by measuring the performance in various processings to make the system more efficient.

In a network system having a plurality of computers connected, it is possible to observe a packet exchange between the computers connected to a network, employing a network trace for monitoring a communication packet (hereinafter simply referred to as a packet) over the network. Thus, the performance is measured by clocking the time (response rate) taken to exchange the information between the computers in various processings while tracing the packet.

Herein, a technique for automatically conducting a packet communication test without assistance was disclosed in which pseudo random data is transmitted to a destination with an IP address in a wireless transmitting and receiving component for test and a port number for packet returning test in a state where a wireless packet test part and a packet network is in packet communication, and the measured bit error rate is compared with a threshold value to measure the quality (e.g., patent document 1).

Published Unexamined Patent Application No. 2002-077070 (page 6, FIG. 3)

However, in the case where a plurality of software components (hereinafter referred to as components) are a plurality of nodes (computers) over the network, it is difficult to guarantee the equivalency in the environment and the time, and compare the system statistical information evenly between the plurality of components. This makes a bottleneck in judging which component has the greatest influence on the efficiency of the overall system.

On the other hand, when the plurality of components are configured on a single node, it is easy to guarantee the equivalency in the environment and the time and compare the system statistical information between the plurality of components.

However, when the plurality of components operate on the single node, the information exchanged between those components never becomes the real packet on the network. Accordingly, the response rate of the system in various processings can not be measured by the method of monitoring the packet as described above.

Also, with the above technique as described in the patent document 1, it is possible to make a communication test for the wireless communication itself between a plurality of nodes, but impossible to measure the system response rate on the single node.

Thus, it is an object of the present invention to measure the system statistical information over a plurality of components configured on the single node.

Moreover, it is another object of the invention to conduct a system test employing a method of measuring the system statistical information on the single node.

SUMMARY OF THE INVENTION

In order to accomplish the above objects, the present invention provides a server that is an information processing apparatus comprising socket generation means, path generation means and transfer execution means. That is, in this server, socket generation means generates a socket as a virtual interface by a combination of an address included in a correspondence between a plurality of components in a computer and a port number, path generation means generates a path for acquiring data transmitted or received between the components via the socket and a network, and transfer execution means transfers the data acquired via the path to a component that is an original destination.

Herein, in this server, the socket generation means generates a received server socket on the basis of the correspondence between the components, and generates a client socket that is a dedicated socket for transmitting the data inheriting the information of the received server socket, when the data is transmitted to the received server socket. Examples of this client socket may include a receiving client socket that is generated when the data is transmitted from a first component of the computer to the server via the receiving server socket, and a transfer client socket that is generated when the data is transmitted from the server to a second component of the computer. Also, the information of the correspondence between the components includes a reception address, a receiving port, a transfer destination address and a transfer destination port in each data transfer. However, the transfer destination address and the transfer destination port may not be obtained depending on the data transfer mode, in which case the transfer destination address uses the transmission destination address of the request and the transfer destination port uses the original destination port of the request.

Also, in generating the path, the path generation means acquires an input stream that is a transmission path of the data transmitted via the network from the computer, and an output stream that is a transmission path of the data transferred via the network to the computer. And the path generation means generates a receiving thread that is a transmission path for acquiring the data as a request transmitted from the first component of the computer and transferring the data to the second component of the computer, and a transfer thread that is a transmission path for acquiring the data as a response transmitted from the second component of the computer and transferring the data to the first component of the computer.

Moreover, the server may further comprise monitor means for observing the data running over the network. In the server with this functional configuration, the monitor means observes the time at which the transmission of the data is started and the time at which the transfer of the data is ended. And this monitor means acquires a destination address, a destination port, an originator address and an originator port included in the data to classify the data of observation object.

Further, the transfer execution means realizes a measurement under various conditions. That is, the transfer execution means may transfer the data in a network environment having a small bandwidth by changing the bandwidth of the network. Also, the transfer execution means may transfer the data in a network environment having an artificial delay by delaying the network. Moreover, the transfer execution means may verify a system behavior by making the measurement in the environment with low reliability of data transfer for the network or the computer.

Also, in order to accomplish the above object, the invention provides a server comprising transmission path setting means and monitor means. That is, in this server, transmission path setting means sets a transmission path via a network for data exchanged between a plurality of components in a computer, and interface setting means sets an interface for passing the data through the transmission path. And the server may further comprise monitor means for monitoring the data acquired through the interface and the transmission path over the network.

Moreover, in order to accomplish the above object, the invention provides a method of monitoring component processing. That is, this method of monitoring component processing comprises the steps of acquiring a correspondence between a plurality of components in a computer connected via a network, generating an interface for passing data through the network from an interconnection between the plurality of components on the basis of the correspondence, acquiring a transmission path of data transmitted via the interface and connecting the acquired transmission path to generate a transmission path for transferring the data, receiving the data via the transmission path and transferring the data, and monitoring the data running on the network.

Herein, the step of generating the interface may further comprise a step of generating a socket on the basis of the correspondence between the components, and a step of generating a socket that is dedicated for the data inheriting the information of the socket when the data is transmitted to the socket. Also, the step of generating the transmission path may further comprise a step of acquiring an input stream for inputting the data from the computer and an output stream for outputting the data to the computer, and a step of generating a receiving thread and/or a transfer thread by coupling the input stream and the output stream.

Also, the invention provides a program for controlling data processing by controlling a computer. That is, the program causes the computer to execute the processing of acquiring a correspondence between a plurality of components in another computer connected via a network, generating an interface for passing data through the network from an interconnection between the plurality of components on the basis of the correspondence, acquiring a transmission path of data transmitted via the interface and connecting the acquired transmission path to generate a transmission path for transferring the data, and receiving the data via the transmission path and transferring the data.

This program causes the computer to execute the processing of acquiring and tracing the data running on the network and recording the trace data for specifying the data. Herein, the processing of acquiring the correspondence between the plurality of components may comprise acquiring an originator address and a port of the data transmitted from the component, and a destination address and a port of the data.

Also, in the program, the processing of generating the interface may comprise generating a socket on the basis of the correspondence between the components, and generating a socket that is dedicated to the data inheriting the information of the socket when the data is transmitted to the socket. Moreover, in the program, the processing of generating the transmission path may comprise acquiring an input stream for inputting the data from another computer and an output stream for outputting the data to another computer, and generating a receiving thread and/or a transfer thread by coupling the input stream and the output stream.

Moreover, the invention provides a program for controlling data processing by controlling a computer. That is, the program causes the computer to serve as transmission path setting means for setting a transmission path via a network for data exchanged between a plurality of components in the computer, and interface setting means for setting an interface for passing the data through the transmission path. Herein, the program may be applicable to not only an echo server but also the computer of measurement object. And the program allows the interface and the transmission path to be set, whereby exchange of data between the plurality of components is enabled via the network. Also, the program causes the computer to serves as monitor means for monitoring the acquired data over the network.

BRIEF DESCRIPTION OF THE DRAWINGS

FIG. 8 is a view showing a correspondence table for use to generate a socket in a socket generation part;

Herein, in this invention, the program may be provided by storing it in a magnetic disk, an optical disk, a semiconductor memory or other recording medium, or distributing it via the network.

DESCRIPTION OF THE PREFERRED EMBODIMENT

The preferred embodiments of the present invention will be described below with reference to the accompanying drawings.

First of all, this invention will be outlined. This invention allows the information to be exchanged between a plurality of components configured on a single node via a network to observe a packet exchange between the components, and acquire the system statistical information. To implement this exchange of information, the invention provides an echo server that receives a request or a response transmitted from each component on the network, and returns it as an echo to an original destination.

Figure 1:
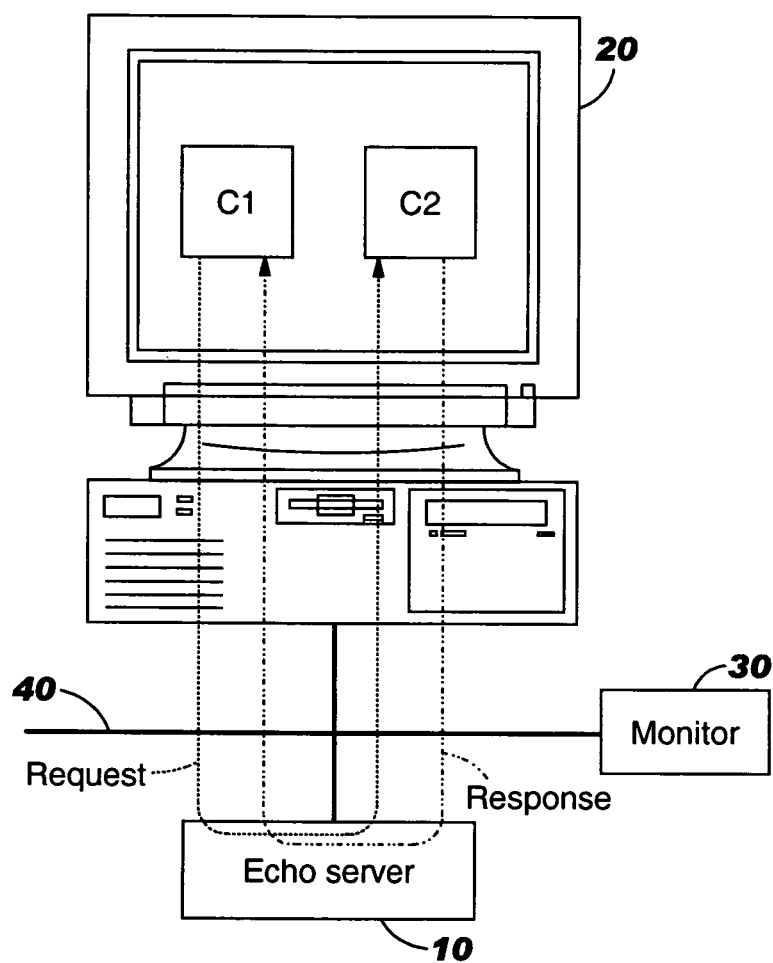
FIG. 1 is a diagram for explaining the concept of an echo server.

FIG. 1 is a view for explaining the concept of an echo server.

In FIG. 1, the echo server 10 is connected to a computer 20 as a node via the network 40 (the echo server 10 itself is a node on the network 40). This echo server 10 consists of one or more computer systems connected to the network 40. The computer 20 has two components C1 and C2. That is, a plurality of components are configured on the single node. In a predetermined process, component C1 sends a request to component C2, and component C2 returns a response to the request to component C1, in which this communication is made via the echo server 10. Also, a monitor (monitoring device) 30 is connected to the network 40 to monitor the packets exchanged via the network 40.

In this manner, in this embodiment, the communication between the plurality of components residing on the single node is made via the echo server 10 to generate a real packet passing over the network 40 in this communication. This packet exchange is observed on the monitor 30 to measure a response rate in this communication and acquire the system statistic information.

The echo server 10 in this embodiment is implemented by one or more computers connected to the network, for example.

Figure 2:
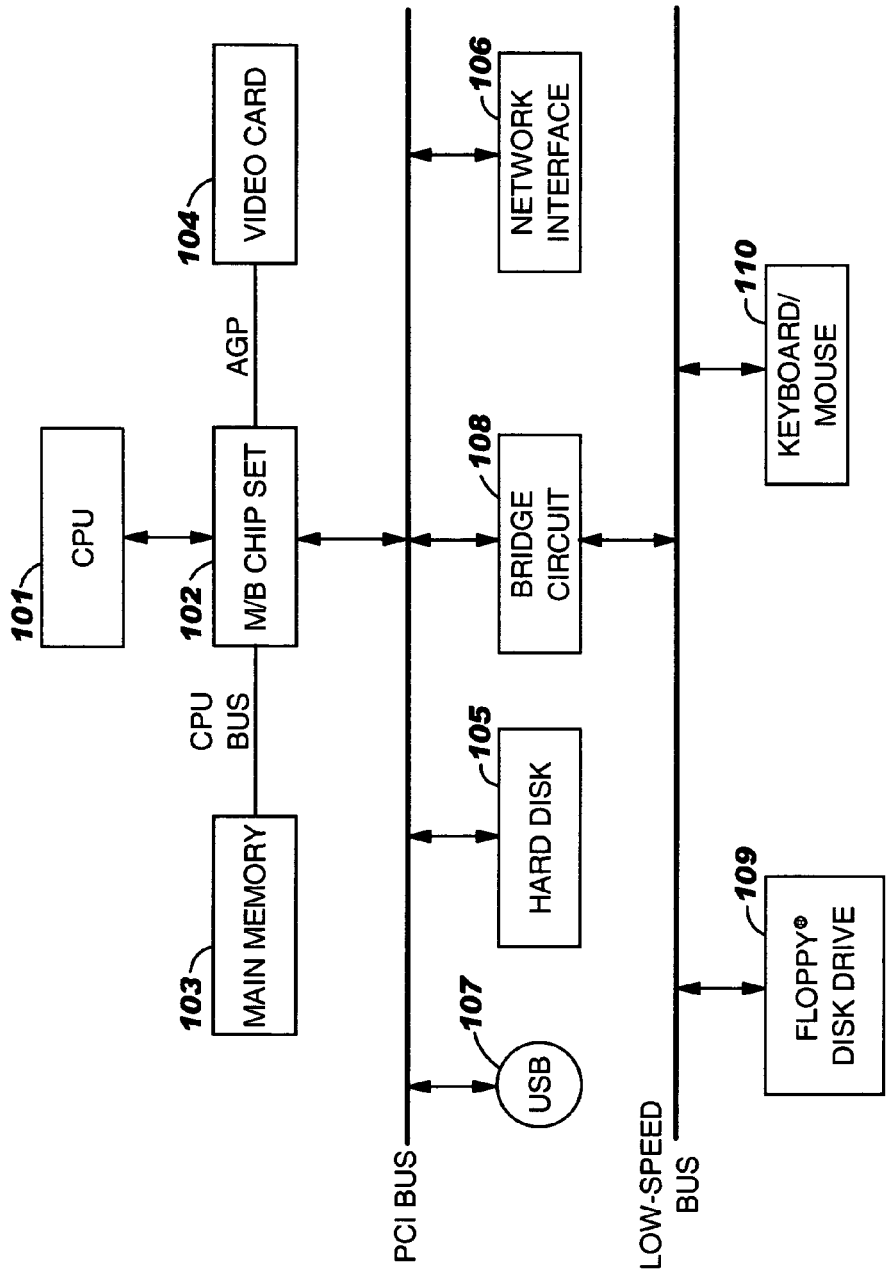
FIG. 2 is a block diagram typically showing a hardware configuration of a computer that implements the echo server.

FIG. 2 is a block diagram typically showing a hardware configuration of the computer for implementing the echo server 10.

The computer as shown in FIG. 2 comprises a CPU (Central Processing Unit) 101 as operation means, a main memory 103 connected to the CPU 101 via an M/B (mother board) chip set 102 and a CPU bus, a video card 104 connected to the CPU 101 via the M/B chip set 102 and an AGP (Accelerated Graphic Port), a hard disk 105 connected to the M/B chip set 102 via a PCI (Peripheral Component Interconnect) bus, a network interface 106 and a USB port 107, and a floppy disk drive 109 and a keyboard/mouse 110 connected to the M/B chip set 102 via the PCI bus, a bridge circuit 108 and a low speed bus such as an ISA (Industry Standard Architecture) bus.

FIG. 2 illustrates one hardware configuration of a computer for implementing this embodiment, but various other configurations may be employed. For example, instead of providing the video card 104, a video memory may be only mounted to process the image data in the CPU 101, or a CD-ROM (Compact Disc Read Only Memory) or DVD-ROM (Digital Versatile Disc Read Only Memory) drive may be provided via an ATA (AT Attachment) interface.

Figure 3:
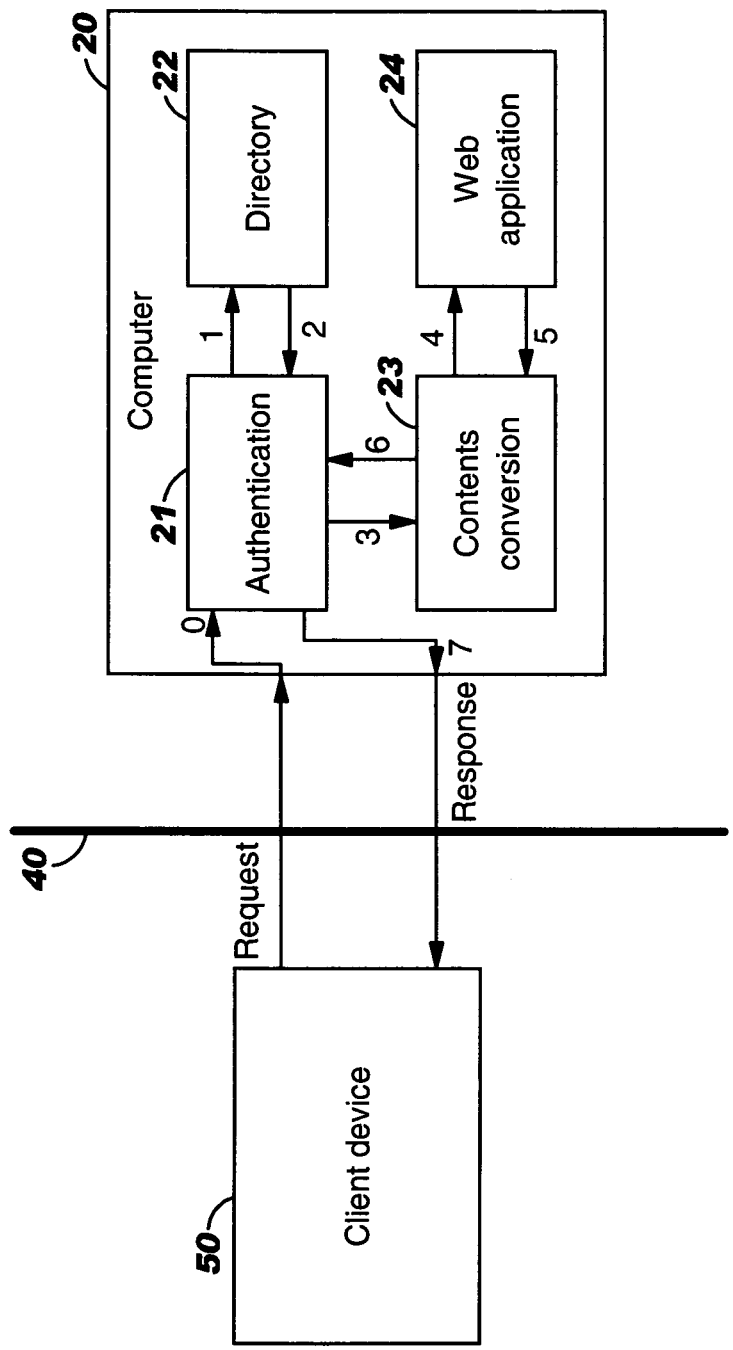
FIG. 3 is a diagram showing a network configuration composed of a client device and a computer comprising a plurality of components.
Figure 4:
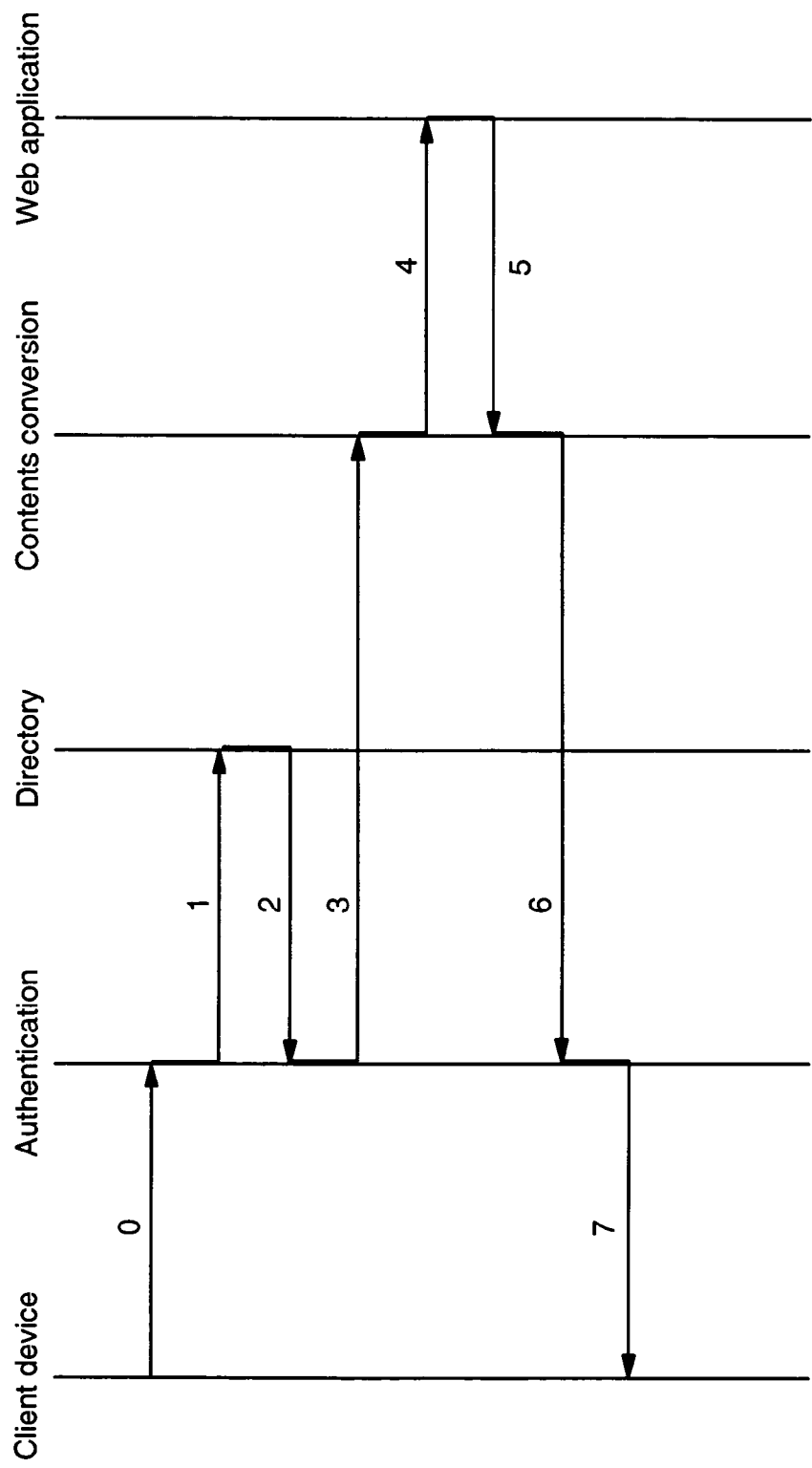
FIG. 4 is a flowchart showing the data flow between the client device and the plurality of components as shown in FIG. 3.

Referring now to FIGS. 3 and 4, the data flow concerning the request and response in the normal operation between a client device for transmitting the request data and receiving the response data and the computer 20 as a server connected over the network to the client device will be described. FIG. 3 is a diagram showing a network configuration composed of the client device 50 and the computer 20 comprising a plurality of components, and FIG. 4 is a flowchart showing the data flow between the client device 50 and the plurality of components as shown in FIG. 3.

The echo server 10 is shown in FIGS. 3 to 6. Firstly, in the system of FIG. 3, data is exchanged between components not via the echo server 10 in the normal operation, while in the system of FIG. 5, the echo server 10 is interposed between the components to acquire and transfer data sent from the components.

As shown in FIG. 3, the client server 50 and the computer 20 are connected via the network 40. This computer 20 has four components, including an authentication (component) 21, a directory (component) 22, a contents conversion (component) 23, and a Web application (component) 24. The data flow between the components until the response data is returned from the computer 20 in response to the request sent from the client device 50 will be described with reference to FIGS. 3 and 4.

If the request data is sent from the client device 50 (Step 0), an authentication process is performed in the authentication component 21 of the computer 20, and the authenticated data is sent to the directory component 22 (Step 1). The predetermined data is extracted on the basis of the sent data in the directory component 22, and the extracted data is sent via the authentication component 21 (Step 2) to the contents conversion component 23 (Step 3). The data, having undergone a contents conversion process in the contents conversion component 23, is sent to the Web application 24 (Step 4). The data, having undergone a predetermined process in the Web application 24, is sent to the contents conversion component 23 (Step 5), and the data having undergone the contents conversion process, is then sent to the authentication component 21 (Step 6). The response data is then returned from the authentication component 21 of the computer 20 via the network 40 to the client device 50 (Step 7). In this manner, in the network system having the configuration as shown in FIG. 3, a predetermined process is performed in each of the plurality of components provided in the computer 20 that is the single node, and data is directly exchanged between the plurality of components inside the computer 20. That is, the request data and the response data are only transmitted and received via the network 40 in the normal operation.

Figure 5:
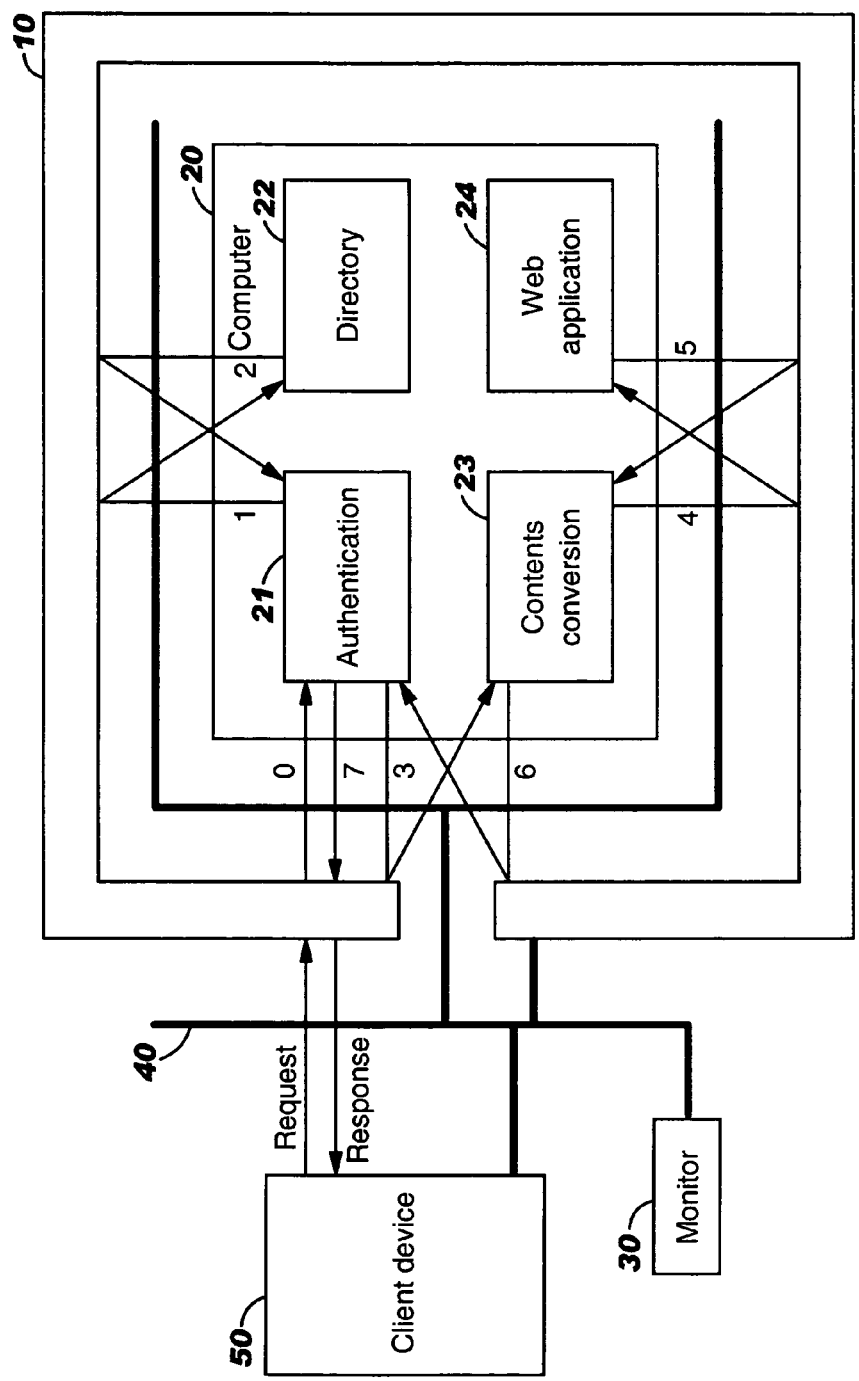
FIG. 5 is a diagram showing a network configuration to measure the response rate between the plurality of components in the computer.

In another embodiment, in measuring the processing speed (response rate) of the plurality of components provided in the computer 20, the echo server 10 is employed, in addition to the configuration as shown in FIG. 3. The configuration and the data flow for measuring the response rate via the echo server 10 will be described with reference to FIGS. 5 and 6. FIG. 5 is a diagram showing a network configuration to measure the response rate between the plurality of components in the computer 20 in this embodiment, and FIG. 6 is a flowchart showing the data flow between the plurality of components, the echo server 10 and the client device 50 as shown in FIG. 5.

The echo server 10 in this embodiment acquires the data sent and received between the plurality of components within the computer 20 and transfers data to the distinction component of the computer 20. In the following description, the above series of processing steps of the echo server 10 is referred to as an echo process. That is, this echo server 10 can interrupt communication between the components when the echo server 10 is connected to the network 40. Though this interrupt will be described later with reference to FIG. 7, a transmission path is generated as an interrupt path between the components to acquire the packet data running on this transmission path, whereby a listener function is implemented. Thereby, the data transmitted and received between the components of the computer 20 that is the single node in the normal operation can be passed over the network 40 as the data communication with the packet data. And the echo server 10 that is another node can receive the packet data running over the network 40 owing to the listener function.

Also, this echo server 10 has a transfer function for transferring the received packet data to the computer 20. That is, in sending data from one component to another component in the computer 20, this echo server 10 receives the data from the one component as the packet data via the transmission path and the network 40 owing to the listener function, and transfers this packet data via the network 40 and the transmission path to another component as the original destination. In this manner, the response rate of each component in the computer 20 is measured by monitoring the packet data running over the network 40, whereby it becomes possible to acquire the statistical information of the system composed of the components in the computer 20.

Figure 6:
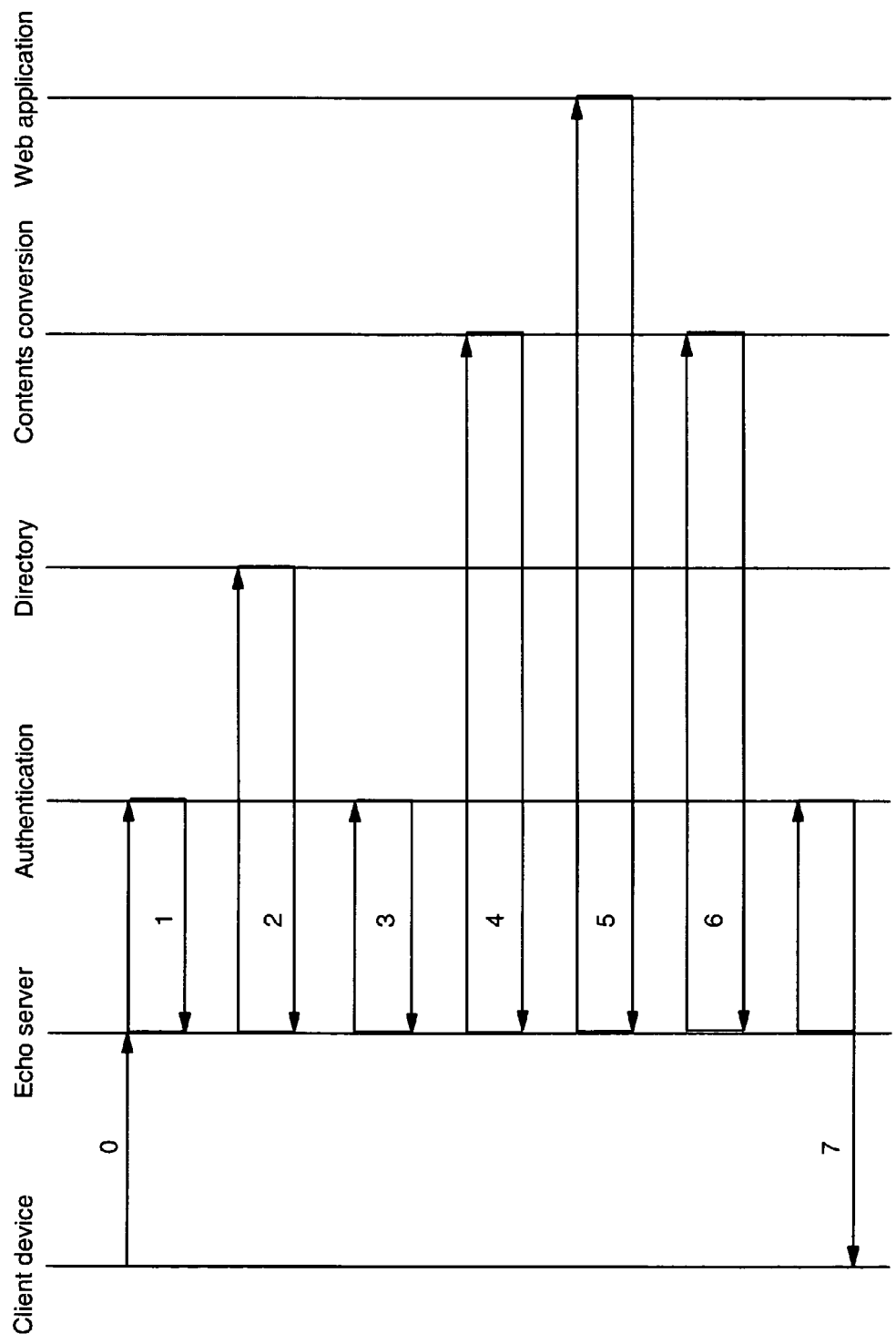
FIG. 6 is a flowchart showing the data flow between the plurality of components, the echo server and the client device as shown in FIG. 5.

As shown in FIGS. 5 and 6, the client device 50 and the computer 20 are connected via the network 40. Further, the network 40 is connected to the echo server 10 and the monitor 30, which observes the packet data running over this network 40. In the example illustrated by FIGS. 5 and 6, the computer 20 has the same components as shown in FIGS. 3 and 4. The data flow processed in the components will be described with reference to FIGS. 5 and 6.

When a request data is sent from the client server 50 (Step 0), an authentication process is performed in the authentication component 21 of the computer 20, and the authenticated data with a destination of the directory component 22 is received (acquired) by the echo server 10 via the transmission path and the network 40, and then transferred to the directory component 22 (Step 1). The predetermined data is extracted on the basis of the sent data in the directory component 22, and the extracted data with a destination of the authentication component 21 is received by the echo server 10 and then transferred to the authentication component 21 (Step 2). Also, the data with a destination of the contents conversion component 23 is received by the echo server 10, and then transferred to the contents conversion component 23 (Step 3). The data having undergone a contents conversion process in the contents conversion component 23, is received by the echo server 10, and then transferred to the Web application 24 (4). The data having undergone a predetermined process in the Web application 24 is received by the echo server 10, and then transferred to the contents conversion component 23 (Step 5), and the data having undergone the contents conversion process, is also received by the echo server 10 and then transferred to the authentication component 21 (Step 6). The response data is then returned from the authentication component 21 of the computer 20 via the network 40 to the client device 50 (Step 7). In this manner, in the network system when the response rate is measured, a predetermined process is performed in each component of the computer 20, and the packet data is acquired and transferred from and to the computer 20 by the echo server 10, whereby data is exchanged between a plurality of nodes. That is, when the response rate is measured, the packet data is transmitted and received via the network 40 for each process. And the data communication over the network 40 is observed by the monitor 30 connected to the network 40.

Figure 7:
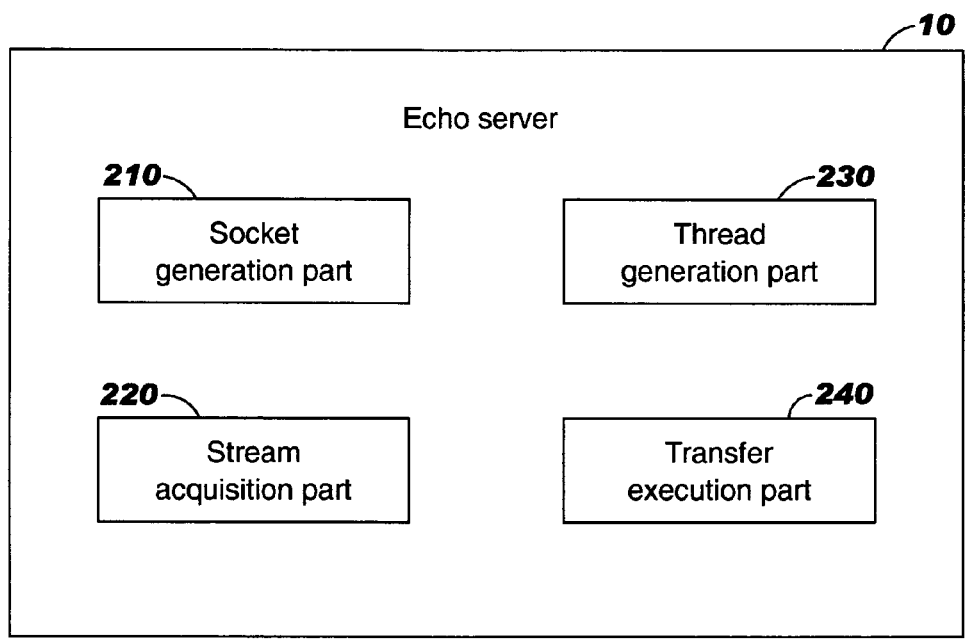
FIG. 7 is a diagram showing the functional configuration of the echo server in this embodiment.

As described above, in this embodiment, the echo server 10 is connected via the network 40 to the computer 20, and the listener function for interrupting communication between the components of the computer 20 is implemented. Also, in the echo server 10, the transfer function for receiving the packet data acquired from one component owing to the listener function, and transferring this packet data to another component is implemented. FIG. 7 is a diagram showing the functional configuration of the echo server 10 in this embodiment. Each function of the echo server 10 is a software block realized under the control of the CPU 101 provided in the echo server 10.

As shown in FIG. 7, the echo server 10 includes a number of functional parts. These parts involve a socket generation part 210 for generating a socket as a virtual interface for connection to the computer 20 by a combination of an IP address and a port number. The echo server 10 also includes a stream acquisition part 220 for acquiring an input stream (data transmission path) and an output stream (data transmission path) from the socket generated in the socket generation part 210. A thread generation part 230 is provided for generating a receiving thread (transmission path) and a transfer thread (transmission path) by coupling streams acquired in the stream acquisition part 220. A transfer execution part 240 is provided for transferring the packet data via a thread generated in the thread generation part 230. Herein, in this embodiment, the functions of the echo server 10 are implemented by the socket generation part 210 as socket generation means, the stream acquisition part 220 and the thread generation part 230 as path generation means, and the transfer execution part 240 as transfer execution means.

The technique a function for generating the socket that is a listener for realizing the listener function mentioned above will be described below. FIG. 8 illustrates a correspondence table for use in generating the socket in the socket generation part 210. As shown in FIG. 8, this correspondence table includes columns for a reception address, a receiving port, transfer destination address, and a transfer destination port. Values are recorded in for 0 to rows. The correspondence table as shown in the figure is created when the echo server 10 starts a process or when the echo server 10 is connected to the network 40 including the computer 20. Of the information useful to create the correspondence table, the reception address and the receiving port must be decided in advance on the basis of the network configuration comprising the echo server 10 and the computer 20, but the transfer destination address and the transfer destination port can be obtained from a correspondence relation (relation for exchanging data) between components in the computer 20. The correspondence table as created in this manner is held in a memory area of the main memory 103 in the echo server 10. If the echo server 10 is connected to the network 40, one listener is generated for each row of the correspondence table from the combination of reception address and receiving port, and transfer destination address and transfer destination port. In this embodiment, the echo server 10 reads the correspondence relation between the components and creates the correspondence table. However, this correspondence table may be provided as an external file or automatically acquired from a specific network service. In any case, this correspondence table is finally held in the main memory 103 to implement the functions of the echo server 10.

The reception address and the receiving port as shown in FIG. 8 are used for the echo server 10 to receive a request from the component as the client of the computer 20, whereby the socket generation part 210 generates a receiving server socket based on this address. This receiving server socket is the entry for receiving the request sent to the receiving port at the reception address, and generated based on the reception address and the receiving port specified for the component at a timing when the echo server 10 is connected to the network 40. That is, the receiving server socket is generated on the basis of the correspondence relation between the components as shown in FIG. 8.

When the receiving server socket is employed in receiving the request from the component of the computer 20, the receiving server socket is closed. Therefore, the echo server 10 can not receive the next request until processing of that request is ended. When the request is actually sent to the receiving port at the reception address, it is desirable to provide a dedicated socket for receiving the request. Thus, the socket generation part 210 generates the receiving client socket that is a dedicated communication path for receiving the request from the component as the client of the computer 20. In transmitting a response, this receiving client socket is employed as a dedicated communication path (exit) for transmitting the response to the component. Herein, this receiving client socket is generated by inheriting the set information of the receiving server socket. The echo server 10 receives the request (or transmits the response) employing the receiving client socket (communication path), whereby the receiving server socket is not enclosed, and the latency time for processing is shortened.

After the request from the component as the client of the computer 20 is received by the echo server 10, an input stream and an output stream are acquired based on the receiving client socket and the transfer destination address and the transfer destination port as shown in FIG. 8. The transfer destination address and the transfer destination port are address and port for transmitting the request from the echo server 10 to the component as the server of the computer 20, whereby the socket generation part 210 generates a transfer client socket based on this address. This transfer client socket is a dedicated socket as the exit for transmitting the request passed to the transfer destination port at the transfer destination address, and generated at a timing when the packet data is transmitted from the echo server 10. In returning the response, this transfer client socket is used as a dedicated communication path (entry) for receiving the response from the component. Herein, the transfer client socket, like the receiving client socket, is generated by inheriting the information of the receiving server socket.

In this manner, the socket generation part 210 changes the destination of data to be normally sent from one component to another within the computer 20 by generating the receiving client socket and the transfer client socket. That is, the echo server 10 connected to the network 40 detects that data is sent between the components, the data sent from the one component is acquired as the packet data, and the destination of this data is set to the echo server 10. The destination of the acquired packet data is then set to the another component and the packet data is transmitted. Thereby, the data transmission from one component to another within the computer 20 can be made the packet data communication via the echo server 10. Then, the data normally exchanged between the components of the computer 20 is passed as the packet data over the network 40, whereby this packet data is observed on the monitor 30.

Also, the echo server 10 in this embodiment is provided with a reception flag for instructing whether or not the transmission and reception of the packet data via the echo server 10, or the echo process is continued, when the request is detected, in a predetermined area of the main memory 103. Though the value of this reception flag is true or false, the operation of the listener function through each socket is controlled by setting the flag to true or false during the echo process.

The stream acquisition part 220 acquires an input stream that is a transmission path of the packet data from the receiving client socket or transfer client socket generated in the socket generation part 210, or the transmission source of the request or response, to the echo server 10. In the following, the transmission path from the component of the computer 20 as the transmission source of the request via the receiving client socket and the network 40 to the echo server 10 is defined as the input stream 1 (denoted as the input stream IS1), and the transmission path from the component of the computer 20 as the transmission source of the response via the transfer client socket and the network 40 to the echo server 10 is defined as the input stream 2 (denoted as the input stream IS2).

Also, the stream acquisition part 220 acquires an output stream that is a transmission path of the packet data to the receiving client socket or transfer client socket generated in the socket generation part 210, or the transfer destination of request or response from the echo server 10. In the following, the transmission path from the echo server 10 as the transfer source of the request via the network 40 and the transfer client socket to the computer 20 is defined as the output stream 1 (denoted as the output stream OS1), and the transmission path from the echo server 10 as the transfer source of the response via the network 40 and the receiving client socket to the computer 20 is defined as the output stream 2 (denoted as the output stream OS2).

The thread generation part 230 generates the thread for receiving the packet data from the request transmission source and transmitting the packet data to the transfer destination server. That is, the thread generation part 230 generates the receiving thread that is a transmission path by combining the input stream from the computer 20 as the transmission source of the request acquired in the stream acquisition part 220 to the echo server 10 and the output stream from the echo server 10 to the computer 20 as the transfer destination server of the request. In the following, the thread generated by combining the input stream IS1 and the output stream OS1 is made the receiving thread (denoted as the receiving thread TH1).

Also, the thread generation part 230 generates the thread for receiving the packet data from the transfer destination server and transmitting the packet data to the request transmission source. That is, the thread generation part 230 generates the transfer thread that is a transmission path by combining the input stream that is a transmission path from the computer 20 as the transmission source of the response acquired in the stream acquisition part 220 to the echo server 10 and the output stream from the echo server 10 to the computer 20 as the transfer destination of the response. In the following, the thread generated by combining the input stream IS2 and the output stream OS2 is made the transfer thread (denoted as the transfer thread TH2).

The transfer execution part 240 starts the receiving thread TH1 by detecting that the request is transmitted from the component of the computer 20, and executes the transfer of the request from the client component of the computer 20 via the echo server 10 to the server component of the computer 20 to transfer data to the server component. Also, the transfer execution part 240 starts the transfer thread TH2 by detecting that the response from the component of the computer 20 is returned, and executes the transfer of the response from the server component of the computer 20 via the echo server 10 to the client component of the computer 20 to transfer data to the client component. Moreover, the transfer execution part 240 judges whether or not the echo process is continued, based on the value of the receiving flag.

In this embodiment, the monitor 30 monitors the flow of the packet data transferred by the transfer execution part 240 over the network 40. That is, the echo server 10 holds the settings for transferring the packet data, and rewrites the transmission destination of the packet data acquired in accordance with the settings and transmits it over the network 40 again. It is possible to observe the time taken to make the data processing in each component of the computer 20 of measurement object by monitoring the packet data.

Figure 9:
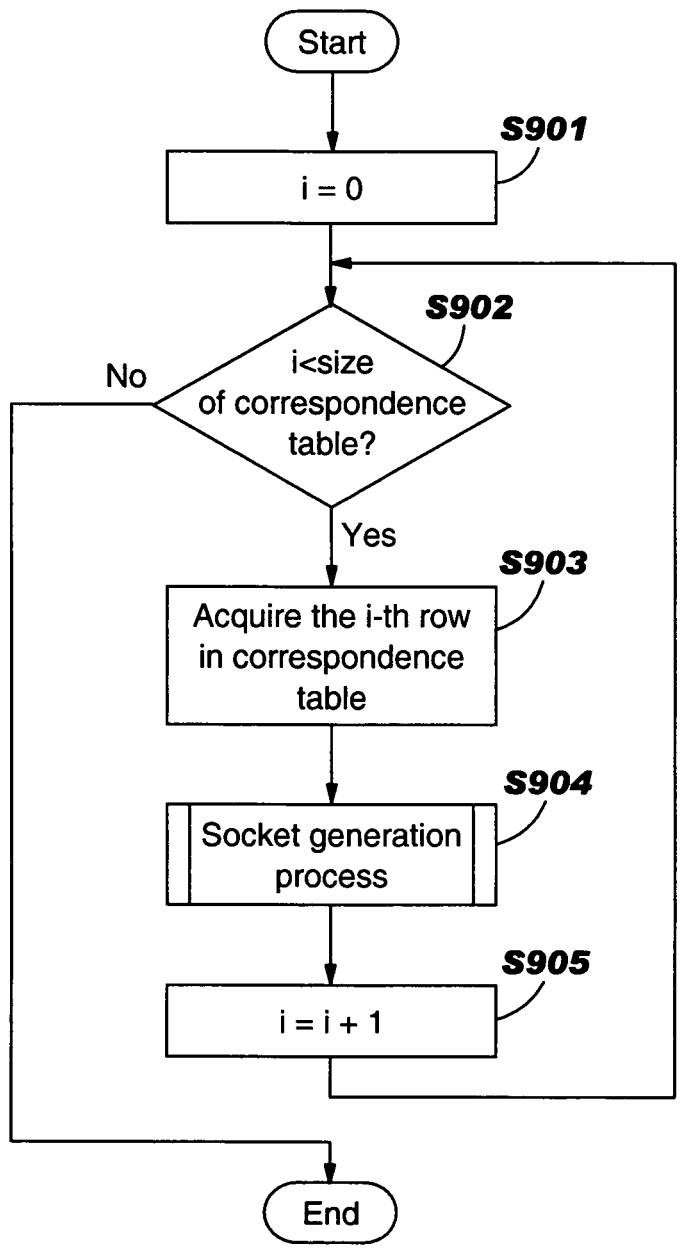
FIG. 9 is a flowchart for explaining a processing flow for starting a socket generation process in an echo server.

A processing flow in the echo server 10 will be described below using a flowchart. FIG. 9 is a flowchart for explaining the processing flow for starting the socket generation process in the echo server 10.

If the echo server 10 is connected to the network 40 comprising the computer 20 to be measured, the socket generation part 210 reads a correspondence table which contains the reception address, receiving port, transfer destination address and transfer destination port. The table is held in the main memory 103 of the echo server 10 the parameter i indicating the number of rows in the correspondence table is set to 0

(Step S901). Next, the socket generation part 210 judges whether or not the parameter i is smaller than the size of the correspondence table (number of rows in the correspondence table) (Step S902). At Step S902, if the parameter i is smaller than the number of rows in the correspondence table, the socket generation part 210 acquires the value of each item at the i-th row in the correspondence table (Steps 903). After the value of each item at the i-th row in the correspondence table is acquired, the socket generation process is performed (Step S904) which will be described later with reference to FIG. 10.

When the socket generation process corresponding to the i-th row in the correspondence table ends in Step S904, the socket generation part 210 increments the parameter i by one (Step S905), and processing return to Step S902, for each subsequent row i. When the value of parameter i is determined to be larger than the number of rows in of the correspondence table in Step S902, the reading process of the correspondence table in the socket generation part 210 is ended.

Figure 10:
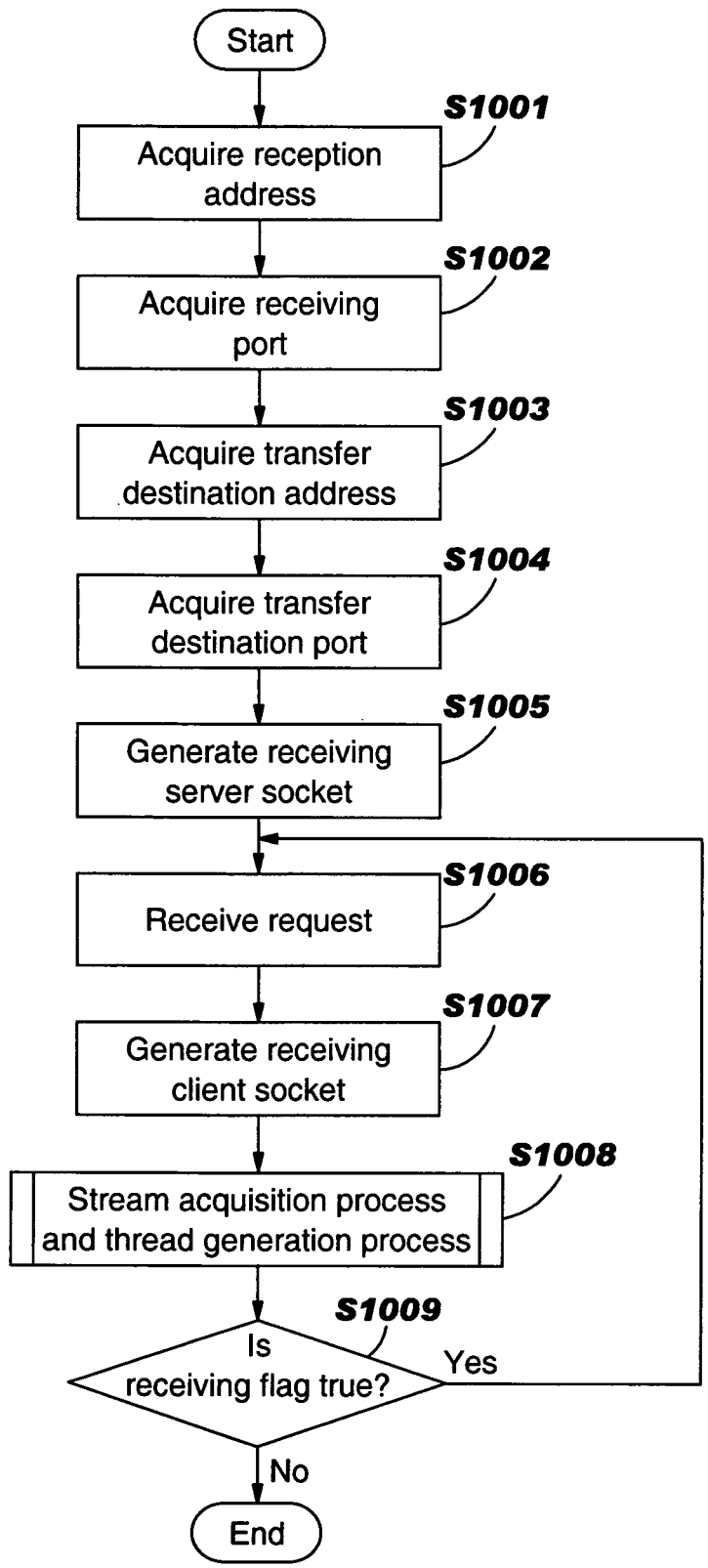
FIG. 10 is a flowchart for explaining the flow of the socket generation process in the socket generation part.

FIG. 10 is a flowchart for explaining the flow of the socket generation process in the socket generation part 210 as shown at Step S904 in FIG. 9.

After the value of each item at the i-th row in the correspondence table is acquired at Step S903 in FIG. 9, the socket generation part 210 acquires the reception address from the value of the correspondence table (Step S1001), and acquires the receiving port (Step s1002). Also, the socket generation part 210 acquires the transfer destination address from the value of the correspondence table (Step S1003), and acquires the transfer destination port (Step S1004). The socket generation part 210 generates a receiving server socket that is an entry of the request sent from the computer 20, on the basis of the reception address acquired at Step S1001 and the receiving port acquired at Step S1002 (Step S1005).

After a request from the client component of the computer 20 is received (Step S1006), the socket generation part 210 generates a receiving client socket that is a dedicated transmission path for receiving the request from the client component on the basis of the reception address and the receiving port (Step S1007). Namely, the transmission and reception of the packet data concerning the request are carried out employing the receiving client socket generated at Step S1007. Herein, after the receiving client socket is generated at Step S1007, the processing is assigned from the socket generation part 210 to the stream acquisition part 220, the stream acquisition process as will be described later with reference to FIG. 11 and the thread generation process of FIG. 12 to be performed after the stream acquisition process are conducted (Step S1008).

After the stream acquisition process, the thread generation process and the thread process are ended, the transfer execution part 240 determines whether or not the receiving flag is true (step 1009). If the receiving flag is true at Step S1009, the processing beginning Step S1006 is repeated to transfer the request. Also, if the receiving flag is found to be set to false at Step S1009, the receiving socket generation process is ended.

Figure 11:
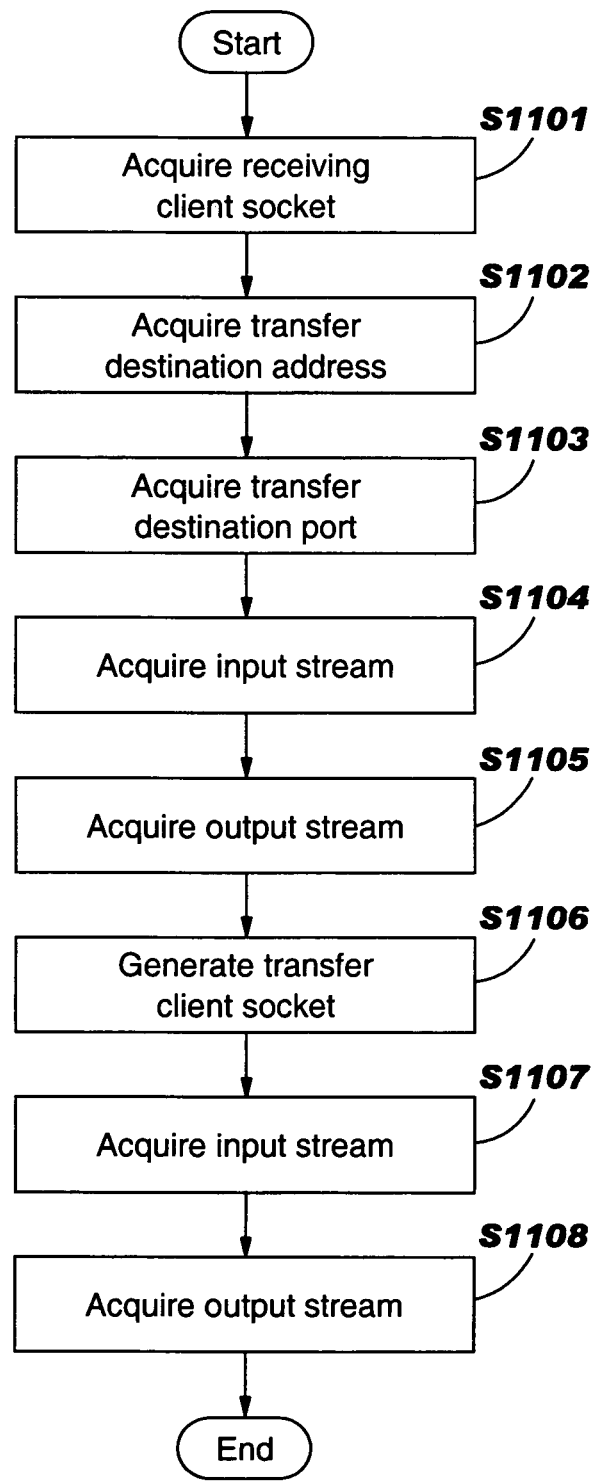
FIG. 11 is a flowchart for explaining the flow of a stream acquisition process in a stream acquisition part and a transfer process in a transfer execution part.

FIG. 11 is a flowchart for explaining the flow of a stream acquisition process in the stream acquisition part 220 and a transfer process in the transfer execution part 240 at Step S1008 in FIG. 10.

After the processing of the stream acquisition part 220 is assigned at Step S1008 in FIG. 10, the stream acquisition part 220 acquires the receiving client socket generated in the socket generation part 210 (Step S1101). Also, this stream acquisition part 220 acquires the transfer destination address acquired from the correspondence table (Step S1102), and acquires the transfer destination port (Step S1103).

The stream acquisition part 220 acquires the input stream IS1 on the basis of the receiving client socket acquired at Step S1101 and the information of address and port of the echo server 10 itself (Step S1104). This input stream IS1 is the transmission path for transmitting the request from the client component through the receiving client socket to the echo server 10. Also, the stream acquisition part 220 acquires the output stream OS1 on the basis of the information of address and port of the echo server 10 itself and the transfer destination address and the transfer destination port acquired at Steps S1102 and S1103 (Step S1105). This output stream OS1 is the transmission path of the packet data for transmitting (transferring) the request from the echo server 10 to the server component of the computer 20.

After the input stream IS1 and the output stream OS1 are acquired at Steps S1104 and S1105, the socket generation part 210 generates a transfer client socket that is a dedicated transmission path for transferring the request to the server component on the basis of the transfer destination address and the transfer destination port acquired at Steps S1102 and S1103 (Step S1106).

After the transfer client socket is generated at Step S1106, the stream acquisition part 220 acquires the input stream IS2 on the basis of the transfer client socket and the information of address and port of the echo server 10 itself (Step S1107). This input stream IS2 is the transmission path of the packet data for transmitting the response from the server component through the server component of the computer 20 to the echo server 10. Also, the stream acquisition part 220 acquires the output stream OS2 on the basis of the information of address and port of the echo server 10 itself and the transfer client socket (Step S1108). This output stream OS2 is the transmission path of the packet data for transmitting (transferring) the response from the echo server 10 to the client component of the computer 20.

Figure 12:
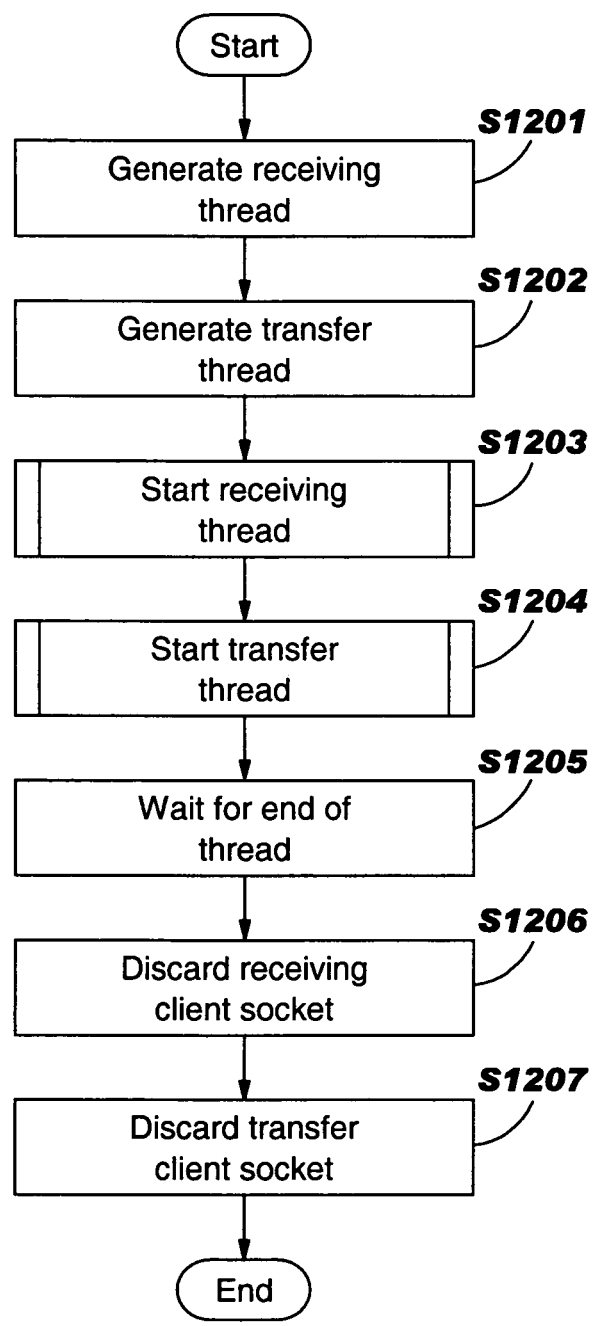
FIG. 12 is a flowchart for explaining the flow of a thread generation process in a thread generation part.

FIG. 12 is a flowchart for explaining the flow of a thread generation process in the thread generation part 230, which is performed after the stream acquisition process as shown in FIG. 11.

After the stream acquisition process as shown in FIG. 11 is performed, the thread generation part 230 generates a receiving thread TH1 by combining the input stream IS1 and the output stream OS1 as the parameters acquired in the stream acquisition part 220 (Step S1201). This receiving thread TH1 is a transmission path for receiving the packet data from the request transmission source and transmitting this packet data to the transfer destination server. Also, the thread generation part 230 generates a transfer thread TH2 by combining the input stream IS2 and the output stream OS2 as the parameters acquired in the stream acquisition part 220 (Step S1202). This transfer thread TH2 is a transmission path for receiving the packet data from the transfer destination server and transmitting this packet data to the request transmission source.

And if a request is sent from the client component of the computer 20, the transfer execution part 240 starts the receiving thread through the receiving thread TH1 as the transmission path (Step S1203). Also, if a response is sent from the server component of the computer 20, the transfer execution part 240 starts the transfer thread through the transfer thread TH2 as the transmission path (Step S1204). The thread processes at steps 1203 and 1204 will be described later with reference to FIG. 13.

After starting the receiving thread and the transfer thread, the transfer execution part 240 waits until these threads are ended (Step S1205). When the receiving thread is ended, the transfer execution part 240 discards the receiving client socket employed in the receiving thread (Step S1206). Also, if the transfer thread is ended, the transfer execution part 240 discards the transfer client socket employed in the transfer socket (Step S1207).

Figure 13:
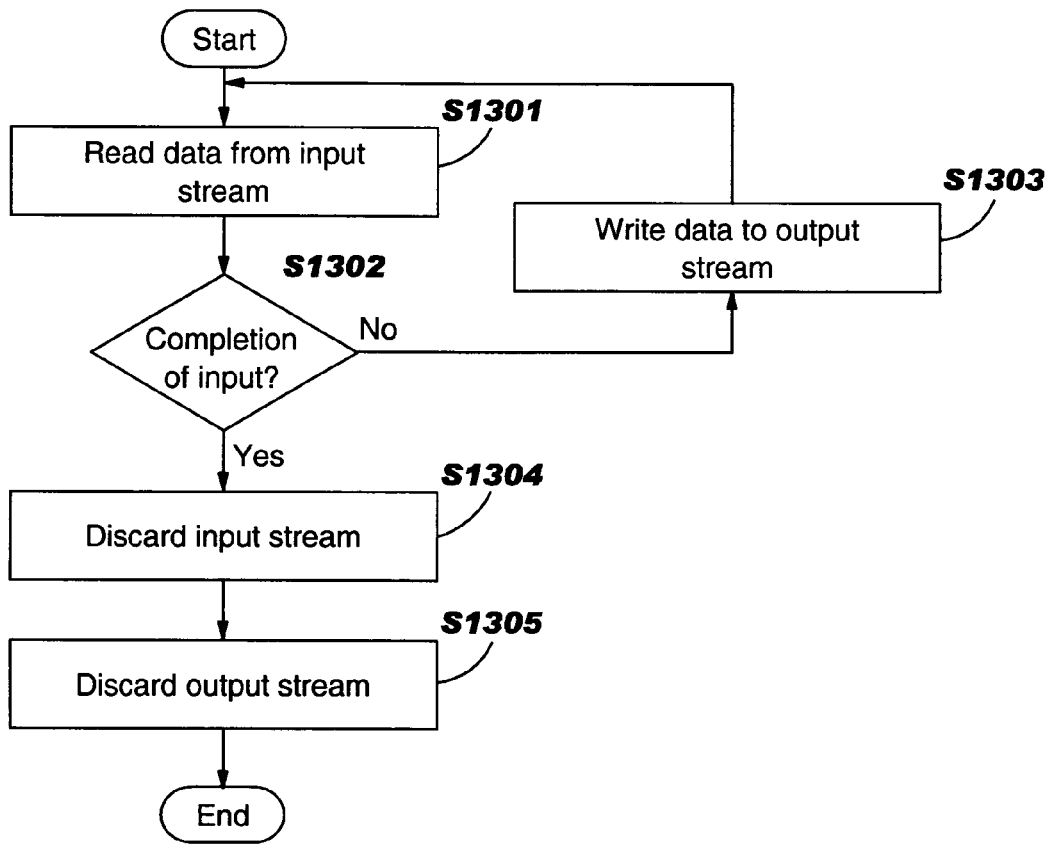
FIG. 13 is a flowchart for explaining the flow of a thread process in the transfer execution part.

FIG. 13 is a flowchart for explaining the flow of a thread process (transfer process of the packet data) in the transfer execution part 240. Herein, the processing for starting the receiving thread at Step S1203 in FIG. 12 will be described.

After the thread process is started, the transfer execution part 240 reads the packet data of request from the input stream IS1 (Step S1301). The transfer execution part 240 then determines whether or not the input from the input stream IS1 is completed (Step S1302). If it is judged that the input is not ended in Step S1302, the data is written into the output stream OS1 (Step S1303). The packet data is read and written until the input from the input stream IS1 is ended. After it is determined that the input is completed at Step S1302, the transfer execution part 240 discards the input stream IS1 (Step S1304). Also, the transfer execution part 240 discards the output stream OS1 (Step S1305).

In this manner, the echo server 10 in this embodiment relays the request returned from the client component of the computer 20 via the network 40, and transfers it to the server component of the computer 20 by changing the transmission source address and destination address of the packet data of this request. Also, the echo server 10 relays the response returned from the server component of the computer 20 via the network 40 and transfers it to the client component of the computer 20 by changing the transmission source address and destination address of the packet data of this response. In this manner, the packet data of the request and response exchanged within the computer 20 is passed over the network 40, whereby the packet data is monitored on the monitor 30. It is possible to measure the time taken to make the processing in the server component by observing the packet data from the time when returning the packet data of the request is started until the time when receiving the packet data of the response is ended.

Figure 14:
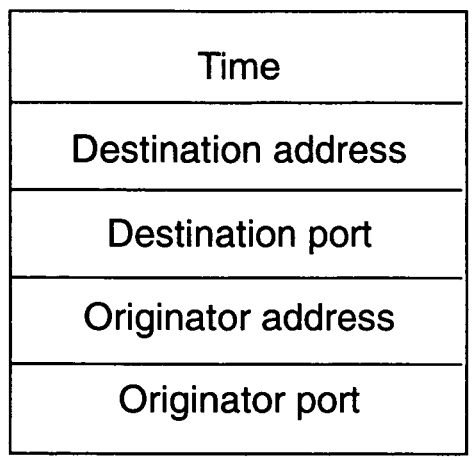
FIG. 14 is a view showing a data structure of the packet data observed on the monitor.

FIG. 14 is a view showing a data structure of the packet data observed on the monitor 30.

As shown in FIG. 14, the packet data includes the time when the packet data is transmitted, the destination address that is the address of the destination for transmitting this packet data, the destination port that is the port of the destination for transmitting the packet data, the originator address that is the address of the originator of the packet data, and the originator port that is the port of the originator of the packet data. In this embodiment, data is once transmitted from the computer 20 to the echo server 10 provided on the network 40 and returned from the echo server 10 to the computer, although the data is normally exchanged between the components of the computer 20. Accordingly, the packet data in which the destination is the echo server 10 and the originator is the computer 20 and the packet data in which the destination is the computer 20 and the originator is the echo server 10 are generated and monitored for one communication between the components. Also, in this embodiment, the packet data running over the network 40 is observed on the monitor 30 provided on the network 40 separately from the echo server 10.

Figure 15:
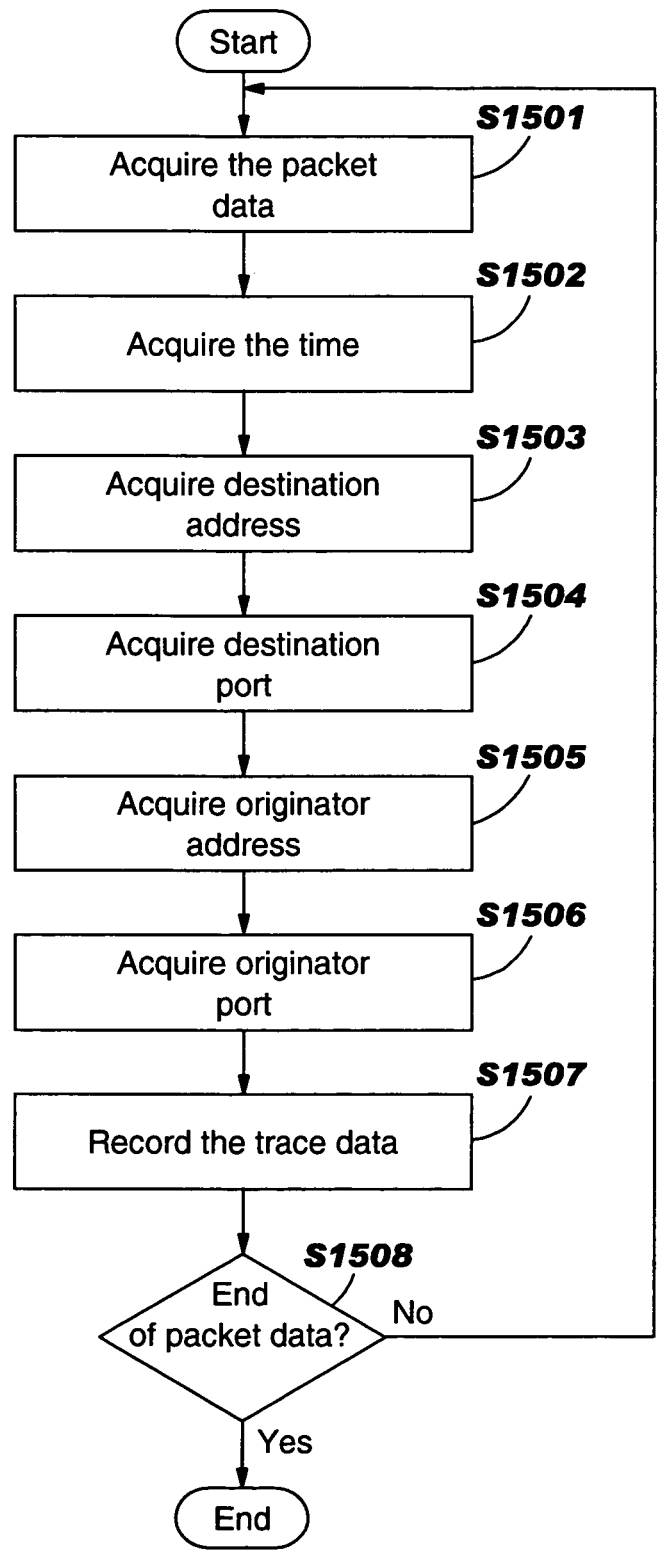
FIG. 15 is a flowchart for explaining the processing flow for observing the packet data on the monitor.

FIG. 15 is a flowchart for explaining the processing flow for observing the packet data on the monitor 30.

After the receiving thread is started at Step S1203 in FIG. 12, the packet data is transmitted from the client component of the computer 20 to the echo server 10 over the network 40. The monitor 30 connected to the network 40 acquires the packet data running over the network 40 (step 1501). And the monitor 30 acquires the time from the packet data (Step S1502). Next, the monitor 30 acquires the destination address from the packet data (step 1503), and acquires the destination port (Step S1504). Moreover, the monitor 30 acquires the originator address (Step S1505), and acquires the originator port (Step S1506). The monitor 30 then records the trace data in the memory area provided within the apparatus on the basis of the items acquired at Steps S1502 to S1506 (Step S1507). Next, the monitor 30 determines whether or not the packet data is ended (Step S1508). If not, the processing from Step S1501 to Step S1508 is repeated until transmission of a plurality of pieces of packet data is ended. When it is determined at Step S1508 that the thread as shown at Step S1205 in FIG. 12 has ended, whereby if the transmission of the packet data is ended, the monitor 30 ends the processing and waits until the next packet data is transmitted. In this way, it is possible to measure the time taken to carry out the processing in the component of the computer 20 by analyzing the contents of the trace data, such as the time recorded at Step S1507. Thereby, the processing time for each component is measured, and it is known which component takes a lot of processing time.

By the way, in the basic operation example as described above, the correspondence table of FIG. 8 is initially created, and the socket generation process is performed on the basis of the information of the correspondence table (see FIG. 9). In this correspondence table, the transfer destination address and the transfer destination port may be unspecified. In such a case, the echo server 10 employs the transmission source address of the request as the transfer destination address, and the original destination port of the request as the transfer destination port in generating the receiving client socket and the transfer client socket in the socket generation part 210 and the stream acquisition part 220 respectively. Thereby, the thread is generated to return the request to the transmission source node of the request (referred to as an echo back). The thread process itself using the thread has the operation as described with reference to FIG. 13.

Employing the echo server 10 as described above, the processing time for each component is measured in the system consisting of a plurality of components provided for one computer 20. Also, the monitor 30 may be connected to the network 40, and does not need to be incorporated into the computer 20 of measurement object, whereby there is no load on the processing in the components of the computer 20. Though the echo server 10 and the monitor 30 are provided separately in this embodiment, a monitor function equivalent to that of the monitor 30 may be provided within the echo server 10, as far as it can measure the packet data running over the network 40. In this case, the monitor function within the echo server 10 operates as monitor means.

In the above embodiment, the socket and the transmission path of the packet data are generated as the interface by the socket generation part 210, the stream acquisition part 220 and the thread generation part 230 within the echo server 10. The equivalent functions may be provided within the computer 20, so that the socket and the transmission path can be generated in the computer 20. Also, exchange of data between the components is made through the socket and the transmission path via the network. Then, it is possible to monitor the packet data running over the network 40 in the same manner as when the socket and the transmission path are generated in the echo server 10. Further, the bandwidth for use in the data transfer over the network 40 can be changed through the data processing by the transfer execution part 240 in the echo server 10 as described above. Also, it is possible to verify a behavior of the processing rate in the component of the computer 20 in the network environment with a smaller bandwidth by observing data running over the network by setting the bandwidth smaller.

Moreover, the data transfer over the network 40 can be artificially delayed through the data processing by the transfer execution part 240 of the echo server 10. Thereby, it is possible to verify a system behavior by simulating the processing time for each component of the computer 20 in the system in the network environment where a delay may be caused in the network 40.

Moreover, an error can be caused in the data transfer over the network 40 or within the computer 20 through the data processing by the transfer execution part 240 of the echo server 10. Thereby, even when the network 40 or the computer 20 is configured in an environment with low reliability of the data transfer, it is possible to verify a system behavior in the environment.

As described above, with this invention, it is possible to measure the system statistical information over a plurality of components configured on a single node, and conduct a system test under various environmental conditions at low cost.

Also, with this invention, the system test can be conducted, employing a method for measuring the system statistical information on the single node.

The invention claimed is:

1. A computer-implemented method of monitoring component processing in a computer system, said method comprising the steps of:
    acquiring a correspondence between a plurality of components of a computer in a single node of a network;
    generating an interface for passing data through said network from an interconnection between said plurality of components;
    acquiring a transmission path of data transmitted via said interface and connecting said acquired transmission path to generate a transmission path for transferring the data;
    receiving said data via said transmission path and transferring the data; and
    monitoring said data transmitted on said network.

2. The method of monitoring component processing according to claim 1, wherein
    said step of generating an interface further comprises generating a socket on the basis of the correspondence between said components, and generating a socket that is dedicated for said data inheriting the information of said socket when said data is transmitted to said socket.

3. The method of monitoring component processing according to claim 1, wherein
    said step of acquiring a transmission path further comprises acquiring an input stream for inputting said data from said computer and an output stream for outputting said data to said computer, and generating a receiving thread and/or a transfer thread by coupling said input stream and said output thread.

4. A non-transitory computer-readable tangible medium having stored therein instructions for controlling data processing, which, when executed by a first computer, cause the first computer to perform the operations of:
    acquiring a correspondence between a plurality of components of a second computer in a single node of a network;
    generating an interface for passing data through said network from an interconnection between said plurality of components;
    acquiring a transmission path of data transmitted via said interface and connecting said acquired transmission path to generate a transmission path for transferring the data; and
    receiving said data via said transmission path and transferring the data.

5. The non-transitory computer-readable tangible medium according to claim 4, wherein
    said processing further comprises:
        acquiring and tracing said data transmitted on said network and recording the trace data for specifying said data is performed by said computer.

6. The non-transitory computer-readable tangible medium according to claim 4, wherein
    said process of acquiring the correspondence between the plurality of components further comprises
        acquiring an originator address and a port of the data transmitted from said component, and a destination address and a port of said data.

7. The non-transitory computer-readable tangible medium according to claim 4, wherein
    said process of generating the interface further comprises generating a socket on the basis of the correspondence between said components, and generating a socket that is dedicated to said data inheriting the information of said socket when said data is transmitted to said socket.

8. The non-transitory computer-readable tangible medium according to claim 4, wherein
    said process of generating the transmission path further comprises acquiring an input stream for inputting said data from said another computer and an output stream for outputting said data to said another computer, and generating a receiving thread and/or a transfer thread by coupling said input stream and said output stream.

* * * * *